April 24, 1951 — M. W. BREED — 2,550,325
LAMP AND LICENSE PLATE SUPPORT
Filed Feb. 18, 1949 — 2 Sheets-Sheet 2
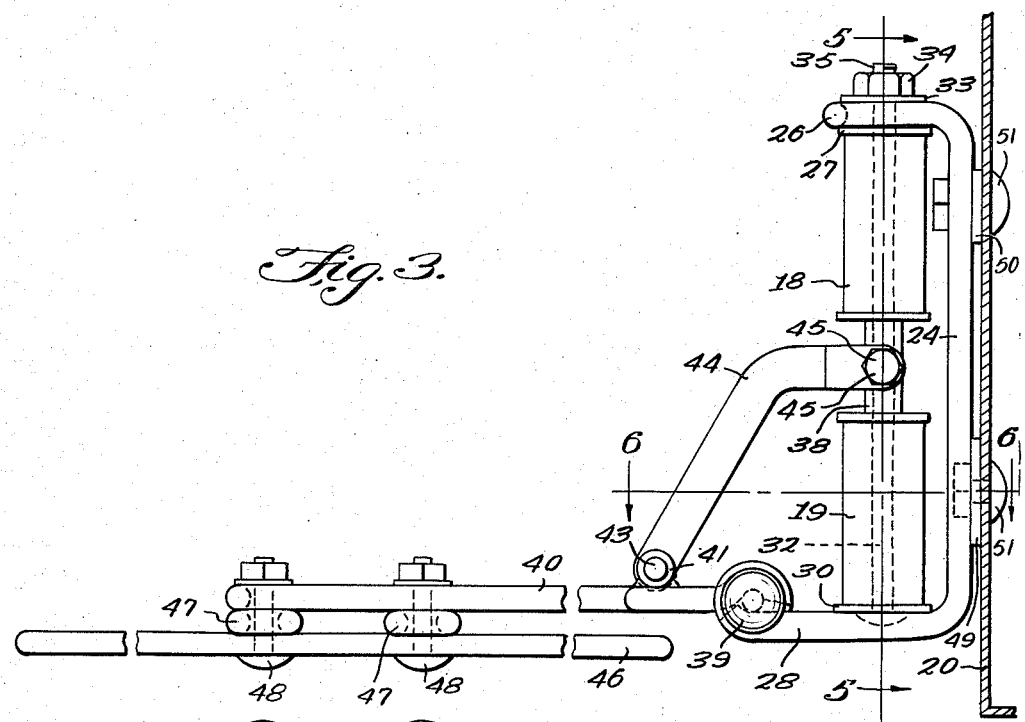
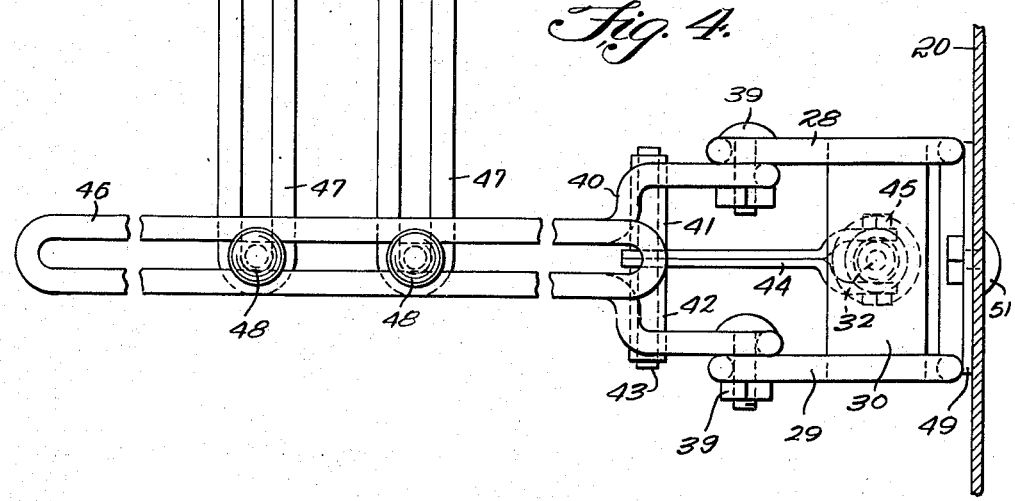
INVENTOR.
Miles W. Breed,
BY Victor J. Evans & Co.
ATTORNEYS Patented Apr. 24, 1951

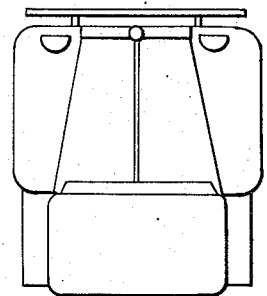
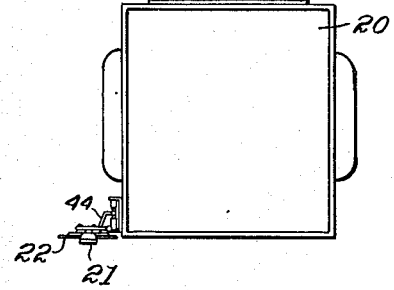
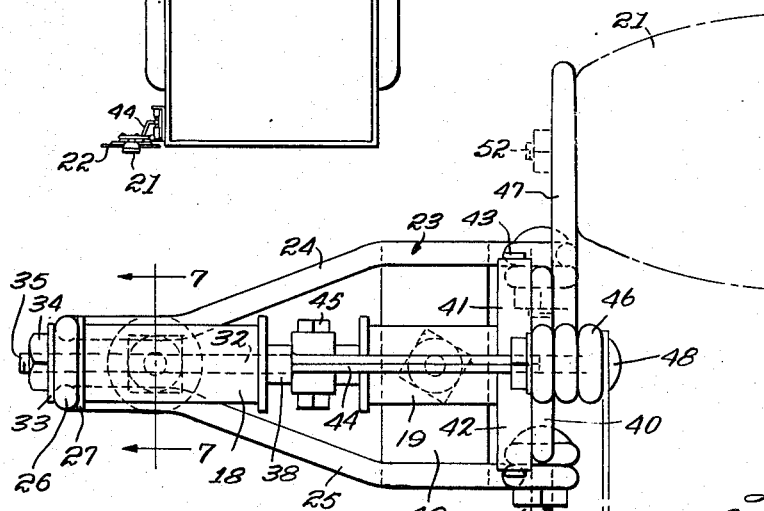
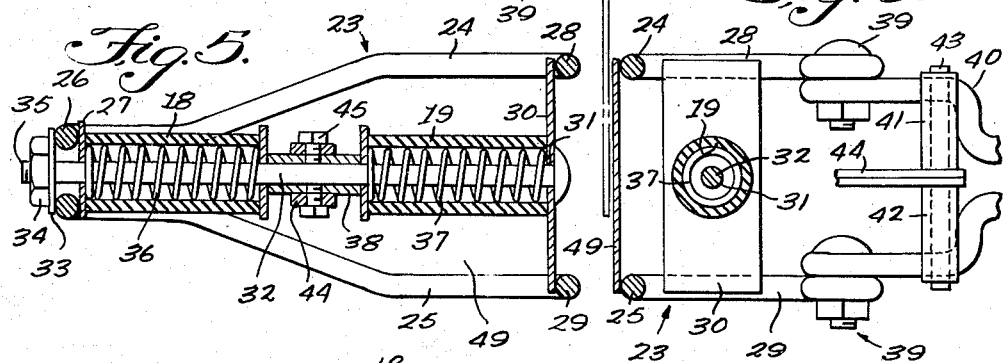

2,550,325

UNITED STATES PATENT OFFICE 2,550,325

LAMP AND LICENSE PLATE SUPPORT

Miles William Breed, Elizabeth, Ill.

Application February 18, 1949, Serial No. 77,143

2 Claims. (Cl. 248—284)

This invention relates to a device for supporting a tail lamp and license plate on the rear end of a vehicle.

The object of the invention is to provide a device for supporting a tail lamp and license plate on the rear end of a vehicle and which is constructed so that in the event that an object contacts or strikes the tail lamp, a portion of the supporting device will move whereby damage will be prevented to the tail lamp.

Another object of the invention is to provide a device for supporting a tail lamp and license plate which is strong, compact and durable, thoroughly reliable for its intended purpose, having very few parts that need repair, and comparatively inexpensive to manufacture and install on the rear end of a vehicle.

Further objects and advantages will be apparent during the course of the following description.

In the accompanying drawings, forming a part of this application, and in which like numerals are used to designate like parts throughout the same:

Figure 1 is a top plan view of a pick-up and delivery truck equipped with the tail lamp and license plate support, according to the present invention;

Figure 2 is an enlarged side elevational view of the support, with the lamp and license plate shown in broken lines;

Figure 3 is an enlarged top plan view of the support;

Figure 4 is an end elevational view of the support;

Figure 5 is a sectional view taken on the line 5—5 of Figure 3;

Figure 6 is a sectional view taken on the line 6—6 of Figure 3; and

Figure 7 is a sectional view taken on the line 7—7 of Figure 2.

Referring in detail to the drawings, numeral 20 designates a conventional "pick-up and delivery type" truck, and the device of the present invention is a support for mounting a tail lamp 21 and a license plate 22 on the rear end of the vehicle 20, whereby damage will be prevented to the tail lamp 21 in the event that the vehicle accidently backs into or contacts an object. The supporting device comprises a bracket 23 which is preferably fabricated of a single piece of heavy metal rod. The rod is shaped to define a pair of spaced legs 24 and 25, and one end of the legs is bent to define a transversely disposed brace 26 which has secured thereto, as by welding, an annular member 27. The other adjacent ends of the legs 24 and 25 are bent at right angles to define a pair of standards 28 and 29 respectively. Extending between the standards 28 and 29 and secured thereto, as by welding, is a metal strip 30 provided with an aperture 31 centrally therein.

A rod or bolt 32 extends between the strip 30 and the annular member 27 and is supported thereby, there being a washer 33 arranged on one end of the rod 32, and a nut 34 is threaded on the threaded end 35 of the bolt or rod 32 for maintaining the parts in assembled relation. A pair of coil springs 36 and 37 are circumposed on the rod 32, and a tubular sleeve 38 is interposed between the springs 36 and 37. A suitable flexible cover member 18 and 19 is positioned over the springs 36 and 37 for protecting the latter.

Secured to the support member 40, as by welding, is a pair of tubular members 41 and 42, and rotatably supported by the tubular members 41 and 42 is a shaft 43. A follower arm 44 has one end connected to the shaft 43, and the other end of the follower arm 44 is connected to the sleeve 38 by a bolt and nut assembly 45.

Carried by the support member 40 arranged longitudinally with respect to the latter, is an elongated link 46. The link 46 serves to support the license plate 22. Also carried by the support member 40 is a pair of short links 47, and suitable bolt and nut assembly 48 project through the elongated link 46, the short links 47 and through the support member 40, for maintaining the links in their proper position on the support member. The pair of short links 47 are for the support of the tail lamp 21, and in use the tail lamp 21 may be either supported above or below the license plate 22.

For securing the bracket 23 to the vehicle 20, a plate 49 provided with a central aperture therein extends between the legs 24 and 25, and is secured thereto as by welding. A metal ring 50 is spaced from the plate 49 and is also secured to the legs 24 and 25 as by welding. Suitable securing elements, such as rivets or bolts 51 are projected through the apertures in the ring 50 and plate 49 and into the vehicle body 20, whereby the supporting device will be secured or maintained immobile on the vehicle.

In use, after the bracket 23 has been secure to the vehicle 20, adjacent the rear end thereto, the license plate 22 is dependingly supported by the elongated link 46, Figure 2. Further, a tail lamp 21 may be supported above or below the license plate 22 as desired, by means of the pair of short links 47, which are adapted to receive the usual bolts 52 that project rearwardly from the tail lamp 21. The short links 47 can be moved toward and away from each other in order to accommodate various sizes of tail lamps, and in the event that the vehicle accidently backs into an object, the object will not damage the tail lamp 21, since the support member 40 is hingedly connected to the bracket 23. Thus, the support member 40 can move or swing either to the rear or forwardly, and the support member 40 is urged to its normal position by means of the coil springs 36 and 37.

While various changes may be made in the detail construction, it shall be understood that such changes shall be within the spirit and scope of the present invention as defined by the appended claims.

I claim:

1. A device for supporting a tail lamp and a license plate comprising a bracket adapted to be secured to a vehicle, said bracket including a pair of spaced legs having one of their ends bent at right angles to define a transversely disposed brace, an annular member secured to said brace, the other adjacent ends of said legs being shaped to define a pair of standards, an apertured strip extending between said standards and secured thereto, a rod extending between said annular member and strip, a pair of coil springs circumposed on said rod, a tubular sleeve interposed between said pair of springs, a support member pivotally connected to said standards, a follower arm having one end pivotally connected to said sleeve and its other end pivotally connected to said support member, an elongated link carried by said support member for attachment to a license plate, a pair of short links arranged at right angles with respect to said elongated link and carried by said support member for attachment to a tail light, and means for securing said bracket to the vehicle.

2. The apparatus as described in claim 1, wherein said last-named means comprises a plate extending between the legs of said bracket and secured thereto, there being apertures in said plate for the projection therethrough of securing elements.

MILES WILLIAM BREED.

REFERENCES CITED

The following references are of record in the file of this patent:

UNITED STATES PATENTS

| Number | Name | Date |
|---|---|---|
| 1,050,395 | Schleicher | Jan. 14, 1913 |
| 1,384,576 | Suhr | July 12, 1921 |
| 1,561,034 | Sperl | Nov. 10, 1925 |